United States Patent [19]

Ferry

[11] Patent Number: 5,365,769
[45] Date of Patent: Nov. 22, 1994

[54] METHOD FOR VERIFYING THE CORRECT OPERATION OF A SAFETY VALVE OF AN OIL WELL

[75] Inventor: Jean-Claude Ferry, Pau, France
[73] Assignee: Elf Aquitaine Production, France
[21] Appl. No.: 946,344
[22] PCT Filed: Mar. 5, 1992
[86] PCT No.: PCT/FR92/00203
  § 371 Date: Dec. 14, 1992
  § 102(e) Date: Dec. 14, 1992
[87] PCT Pub. No.: WO92/15768
  PCT Pub. Date: Sep. 17, 1992

[30] Foreign Application Priority Data
  Mar. 8, 1991 [FR] France .................. 91 02839

[51] Int. Cl.⁵ .................. G01L 27/00; G01M 19/00
[52] U.S. Cl. .................. 73/4 R; 73/168
[58] Field of Search .......... 73/4 R, 168; 166/321, 166/322

[56] References Cited

U.S. PATENT DOCUMENTS

| | | | |
|---|---|---|---|
| 3,653,254 | 4/1972 | Simon | 73/46 |
| 3,799,269 | 3/1974 | Brown et al. | 166/322 |
| 4,428,223 | 1/1984 | Trevisan | 73/4 R |
| 4,448,216 | 5/1984 | Speegle et al. | 137/630 |
| 4,527,415 | 7/1985 | Chabat-Couréde | 73/4 R |
| 4,542,649 | 9/1985 | Charbonneau et al. | 73/168 |
| 4,694,693 | 9/1987 | Gerlowski | 73/168 |
| 4,949,288 | 8/1990 | Bookout | 73/4 R |

FOREIGN PATENT DOCUMENTS

0178126 11/1982 Japan .................. 73/168

Primary Examiner—Hezron E. Williams
Assistant Examiner—Nashmiya Ashraf
Attorney, Agent, or Firm—Bacon & Thomas

[57] ABSTRACT

A method of verifying that a safety valve, normally biased to a closed position and opened by hydraulic pressure applied thereto by a fluid supplied at a constant flow rate, is operating correctly within an oil well involves comparing reference and operating curves associated with the valve. The reference curve represents the hydraulic pressure over time applied to the safety valve to open the valve when the valve is operating correctly. The operating curve is prepared with the safety valve installed within an oil well and also represents the hydraulic pressure over time applied to the safety valve to open the valve. Any deviation between the reference and operating curves indicates a potential malfunction and, possible, a precise type of malfunction associated with the safety valve.

3 Claims, 3 Drawing Sheets

CHARACTERISTIC CURVE
SCSSV TYPE FLAPPER VALVE

SCSSV TYPE F.V. WITH FLOW TUBE STUCK

CHARACTERISTIC CURVE:
SCSSV TYPE BALL VALVE

SCSSV TYPE B.V. WITH BALL PARTIALLY OPEN

METHOD FOR VERIFYING THE CORRECT OPERATION OF A SAFETY VALVE OF AN OIL WELL

BACKGROUND OF THE INVENTION

The present invention relates to a method for verifying the correct operation of a safety valve of an oil well.

In accordance with safety standards, a production well head must be fitted with a safety valve disposed in the well approximately 30 meters below the surface of the ground or of the sea bottom. This valve, most of the time hydraulically actuated, is intended to close the well in the case of a serious accident, for example in the case of a blow out.

In general, such a valve is designed to have a closed rest position, the valve being held in an open position under the effect of the hydraulic pressure sent from the surface by a hydraulic line situated along the production string. If required, the hydraulic pressure is stopped, which then leads to closure of the valve. Thus, any incident or destruction at the well head leads in this manner to the automatic closure of the safety valve.

Since such a valve constitutes an essential element for well security, it is necessary to monitor periodically the correct operation of the valve and of the hydraulic control system. However, actuating the valve is not sufficient in the present case because it is not possible to detect with certainty a possible malfunction such as partial opening which could lead, after a period of production, to the valve being rendered inoperative.

SUMMARY OF THE INVENTION

The object of the present invention is therefore a method for verifying the correct operation of a safety valve of a well, after its first positioning and subsequently in order to perform its maintenance as well as possible.

For this purpose, the invention provides a method for verifying the correct operation of an oil well valve situated at depth characterized in that it comprises the following steps:
  prior production of a reference curve of the hydraulic pressure evolution as a function of time or of the volume pumped for a valve in an optimum state prior to installation there of,
  production of a similar curve for the valve after its installation in the well,
  comparison of the two curves in order to deduce a correct state of operation or a possible malfunction of the valve situated at depth.

Other characteristics and advantages of the present invention will emerge more clearly on reading the following description which is made with reference to the attached drawings.

DETAILED DESCRIPTION OF THE INVENTION

Figure 1:
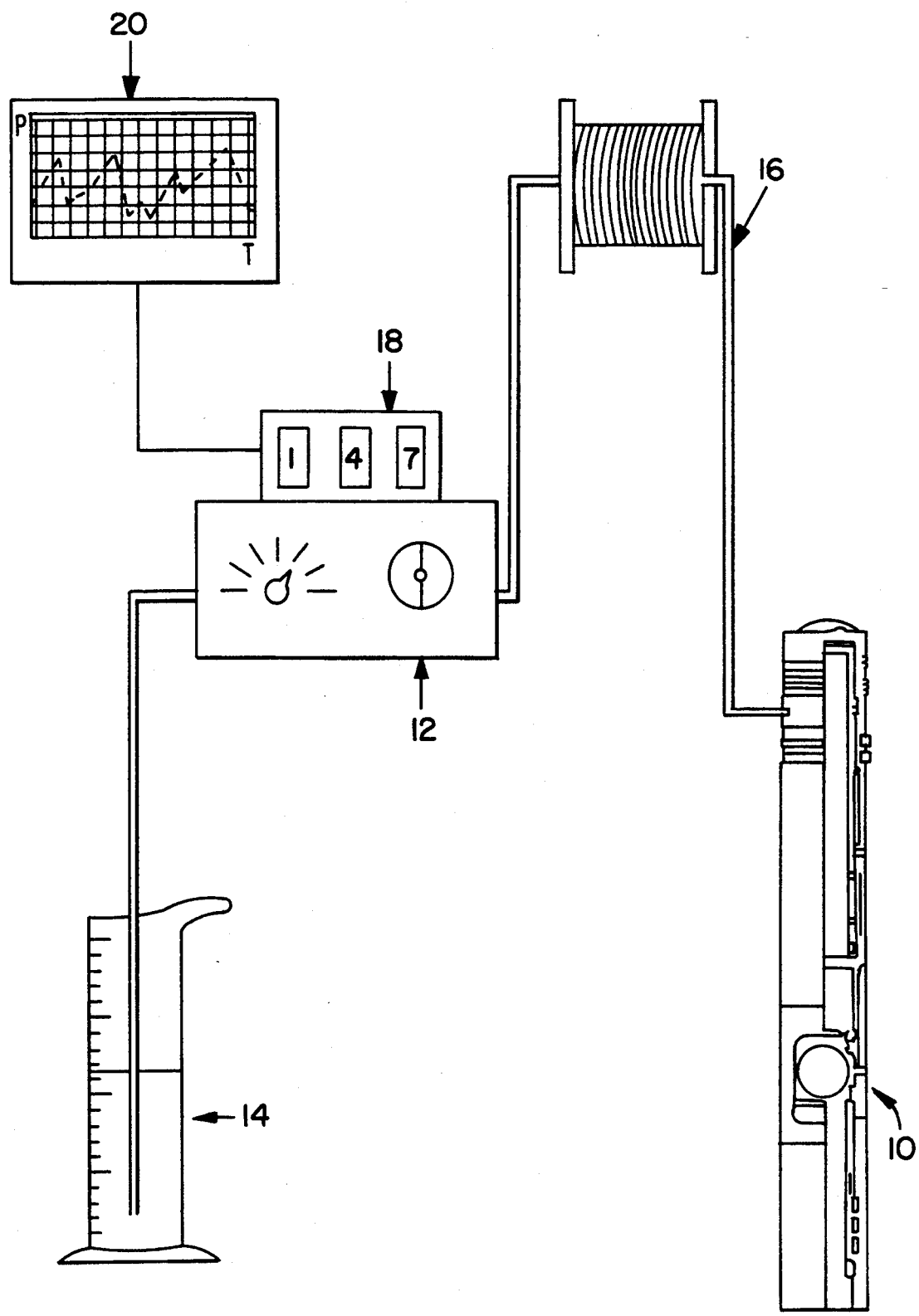
FIG. 1 is a schematic view of a device allowing implementation of the method of the present invention.
Figure 2A:
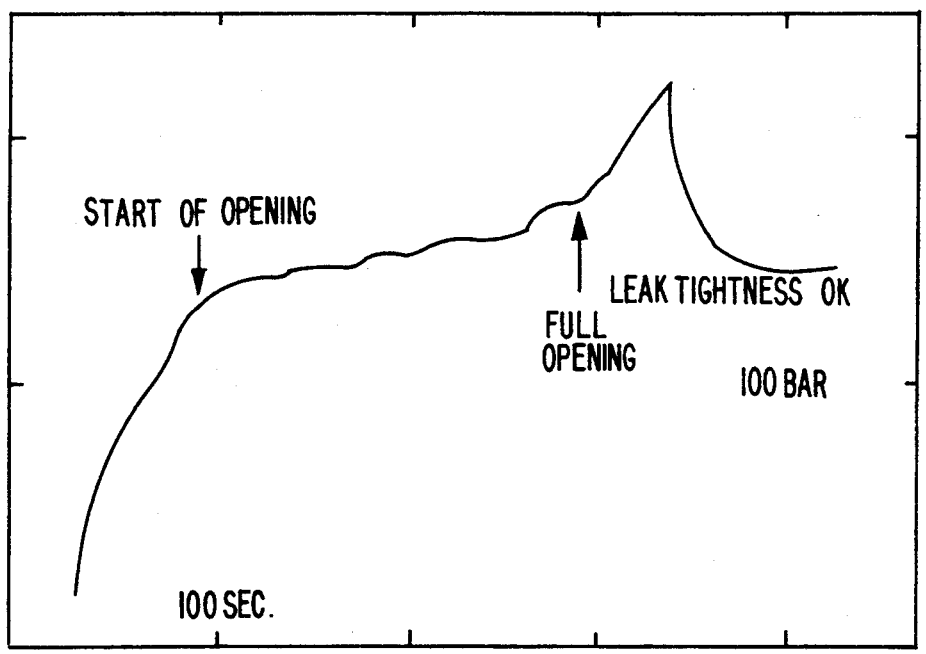
FIGS. 2A, 2B, 3A and 3B are curves obtained with the device in FIG. 1.
Figure 2B:
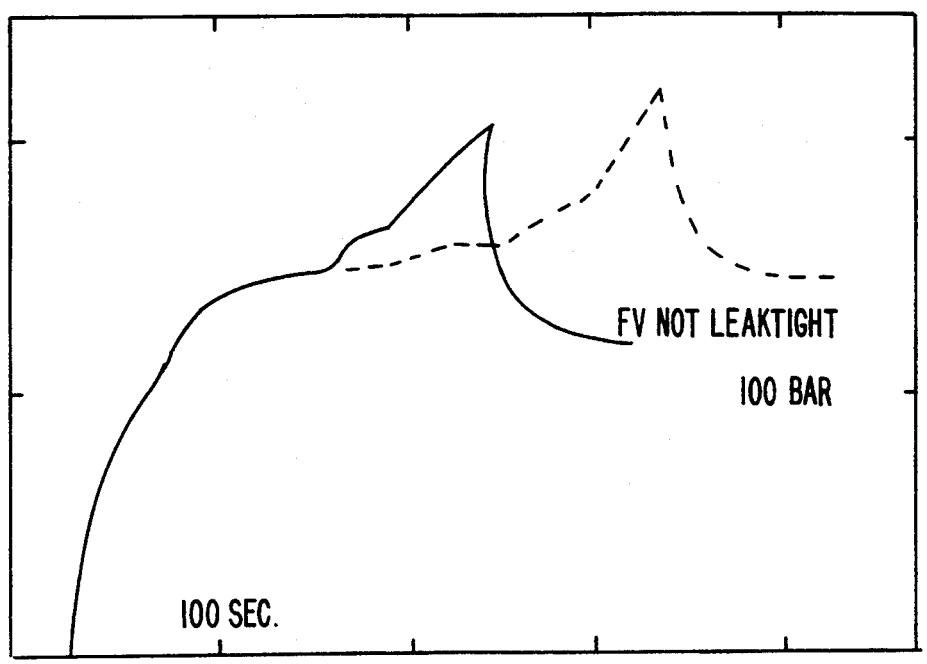
Figure 3A:
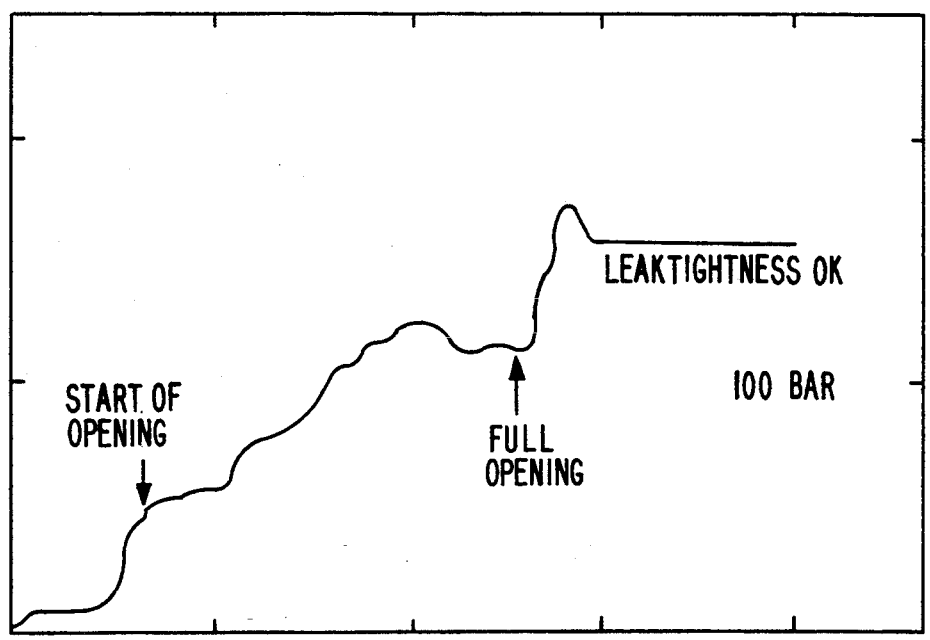
Figure 3B:
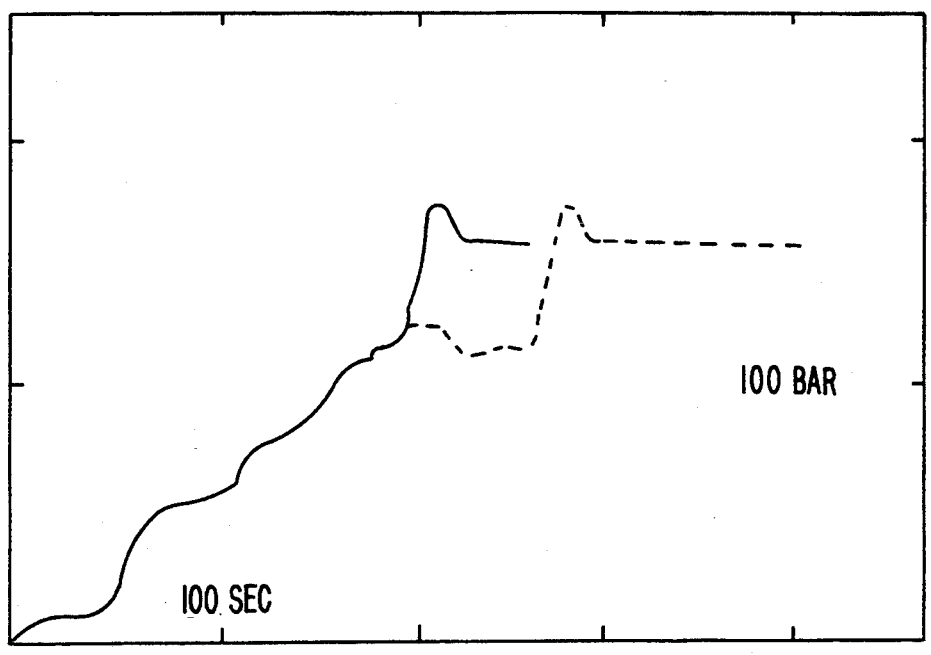

FIG. 1 schematically represents a hydraulic circuit comprising a safety valve 10 intended to be disposed at depth. A positive displacement pump 12 sends a hydraulic liquid 14 through a control line 16 to the valve 10. The hydraulic pressure supplied by the pump 12 is measured by a manometer 18 and the variation of the pressure over time is displayed by means of a recorder 20.

In the example illustrated, the control line has a diameter of 0.6 cm and a length of 120 m. Its control is provided by a Subhydrelf brand oil and a Gilson constant flow rate positive displacement pump. The output is constituted by a paper recorder however, a computer screen or any other display means may also be used.

The method first of all provides for the production, with the help of this device, of a curve $P=f(t)$, P being the hydraulic pressure applied to the valve and t being time. First, after safety valve 10 is closed, the valve is opened, its leaktightness is observed and it is again closed. This prior production may be done in the factory, in the workshop or on site. According to the invention, two curves are then compared, one being obtained by acting on a valve in a known mechanical state and the other being obtained by acting on the same valve in operation at depth in a well. Differences between the two curves then allow diagnosis, when the valve is situated at depth, of a cycling fault as well as any abnormal friction, hard spot, leak, to be made indicating actual or latent malfunction.

FIGS. 2A, 2B, 3A and 3B are explanatory curves of the present method. The pair of curves 2A and 3A represents the evolution of the hydraulic pressure supplied to a valve in a known mechanical state, in the case of a ball valve (3A) and of a flapper valve (2A). In both cases, there is a first phase of progressive increase in the hydraulic pressure leading to the opening of the valve, then, after the pump is stopped, a stabilization phase of the said pressure should be observed in order to signify integrity of the hydraulic circuit assembly. Subsequently, when the valve is closed, the same volume of hydraulic oil should be recovered on return.

The pair of curves 2B and 3B includes in dashed lines curves 2A and 3A respectively, and represents in unbroken lines the same type of curve corresponding to the same type of valve now having a malfunction. Thus, the flapper valve of curve 2B is incompletely opened; it is then noticed in this curve that the defective valve has a time advance as regards its complete opening, which advance is represented by the sharp rise in pressure, the malfunction being because of this easily detectable and representing an incompletely open valve. A leak in the hydraulic system is also noticed, given that the pressure is not stabilized when the pump is stopped. The ball valve of curve 3B also has incomplete opening, the malfunction being made apparent on comparison with curves 3A and 3B; conversely however, this valve has a leaktight hydraulic system, because there is a final pressure stabilization.

Furthermore, any type of mechanical imperfection may be detected by this method, manifesting itself by a difference between the curve relating to the initial valve and the curve relating to the valve having an imperfection, this difference being susceptible of appearing in the form of a shift between the two curves, or alternatively of an amplification, decrease or distortion of one curve with respect to the other.

Thus, the tricky and costly operation consisting in raising the valve to the surface is only carried out in the case when a person skilled in the art is certain that the valve has a malfunction. With a portable computer having the characteristic curves of several types of valves in a known mechanical state stored in memory, it will be easy for the person skilled in the art to perform immediate diagnosis on the actual well site, and thus to ensure more efficient maintenance of this legally compulsory equipment which an oil well safety valve constitutes.

I claim:

1. A method of verifying that an oil well safety valve, normally biased to a closed position and opened by hydraulic pressure applied thereto by a fluid supplied at a constant flow rate, is operating correctly when installed within the oil well comprising:

preparing a reference curve of applied hydraulic pressure versus elapsed time prior to installation of the safety valve in the well and when the safety valve is known to be operating correctly, said curve being prepared by applying hydraulic pressure to the safety valve by supplying fluid at a constant flow rate causing the safety valve to open;

preparing an operating curve of applied hydraulic pressure versus elapsed time when the valve is installed within the oil well, said operating curve also being prepared by applying hydraulic pressure to the safety valve by supplying fluid at a constant flow rate causing the safety valve to open; and comparing the reference and operating curves in order to determine if the safety valve is operating correctly.

2. The method according to claim 1, wherein a deviation between said reference and operating curves indicates a potential malfunction associated with the safety valve.

3. The method according to claim 2, wherein the deviation indicates a precise type of malfunction associated with the safety valve.

* * * * *